July 30, 1946.                J. B. LEVY                2,404,967
           PORTABLE WATER PURIFICATION AND FILTRATION UNIT
                         Filed April 14, 1943

Inventor
Jerome B. Levy
BY
Warren S. Capp
Attorney

Patented July 30, 1946

2,404,967

UNITED STATES PATENT OFFICE 2,404,967

PORTABLE WATER PURIFICATION AND FILTRATION UNIT

Jerome B. Levy, Newark, N. J., assignor, by direct and mesne assignments, to Titeflex, Inc., Newark, N. J., a corporation of New Jersey Application April 14, 1943, Serial No. 483,065

3 Claims. (Cl. 210—16)

My invention relates to a portable apparatus for purifying and clarifying small quantities of water.

It is an object of my invention to provide an apparatus the various units of which, together with chemicals for operation, can be arranged together to form one compact package when not in use, making shipment or storage relatively easy.

A further object is the provision of a portable filtration apparatus which is self-contained, requiring no power for operation other than hand power.

Still another object is to provide water filtration equipment which can be set up and operated by anyone, with a minimum of experience, and without training in the technical or theoretical aspects of water purification. Any person who can follow simple instructions can operate my apparatus with successful results.

With these and other objects in view, my invention consists in the construction, arrangement and combination of the various parts of my device whereby the objects contemplated are attained, as hereinafter more fully set forth, pointed out in my claims and illustrated in the accompanying drawing, in which:

Figure 1:
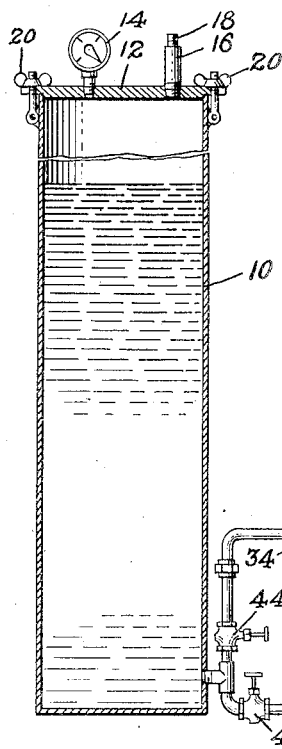
Figure 1 is a vertical sectional view taken through my apparatus, shown as set up ready for the beginning of a water purification operation.

In the drawing I have used the reference numeral 10 to indicate a relatively large supply tank. It is provided with a cover plate 12 having a pressure gauge 14 and a valve stem 16 mounted thereon. The valve stem may be the same as those used on automobile tires, having a threaded nipple 18 for connection to a source of pressure, and containing a built-in check valve, not shown. The cover plate is arranged for fastening to the tank by wing nuts 20, by which a substantially air-tight fit may be effected.

Two vessels 22 and 24 are provided with covers 26 and 28, held on by wing nuts 30. Rods 32 and 33 pass through the covers, carrying plungers 34 and 35. For convenience and economy, vessels 22 and 24 and their fittings may be substantially alike.

The fourth unit, indicated at 36, has a stem 37 passing centrally therethrough, on which a filter stone 38 is mounted. One end of the stem has a central bore 40, and perforations 42 communicating between the bore and the inner surface of the filter stone.

In use, the four units are set up as shown in Figure 1, being interconnected by suitable pipes and fittings indicated generally as 43.

The tank 10 and the vessels 22 and 24 are filled with raw water. A proper quantity of calcium hypochloride is introduced into the water in tank 10. The material is agitated and allowed to remain in contact with the water for about ten minutes. The chlorine released destroys the bacteria and B. coli present.

In the meantime, a mixture of activated carbon and diatomaceous earth may be introduced into the water in vessel 22, the carbon serving to absorb taste, color and odors of the water, as well as excess chlorine in water subsequently coming from tank 10.

Into the water in vessel 24 is introduced a quantity of diatomaceous silica, or filter-aid, sufficient to put a coating of at least $\frac{1}{16}$ inch upon the filter stone in unit 36.

The covers are put in place on all the units, and the plungers 34 and 35 at the beginning of the filter process stand at the top, as shown in full lines in Figure 1.

After the calcium hypochloride has been in the water in tank 10 for ten minutes, with the valves 44 and 46 closed, I apply a hand air pump to the nipple 18 and pump up a pressure of three to five pounds per square inch, as indicated on the gauge 14. When the valve 44 is opened, water will flow out of tank 10 into the top of vessel 22, above the plunger 34. It will force the plunger downward, driving ahead of it the water from unit 22, containing a mixture of activated carbon and filter-aid. This water in turn enters vessel 24, above the plunger 35, and drives ahead of it the plunger 35 and the water in vessel 24 containing clean filter-aid. The latter water passes into the filter unit 36, where the water passes through the filter stone and is discharged from the hollow end 47 of the stem 37, while the filter-aid is retained upon the surface of the stone, forming the actual filter membrane.

When the plunger 35 is fully depressed (as shown in dotted lines), it passes below the outlet fitting 48 in vessel 24, so that the water above the plunger may freely pass on through to the filter unit, where the mixture of filter-aid and carbon is retained by the filter membrane, forming a secondary coat of sufficient thickness to permit effective action of the activated carbon on the water as it passes through.

It will be understood that the plunger 34 reaches the bottom of its stroke at about the same time as the plunger 35, and the outlet fitting 49 in vessel 22 is arranged above the top of the plunger in its depressed position, so that water from tank 10 can pass through vessel 22 without obstruction, and on through vessel 24 in the same way. If desired, the valve 44 may then be closed and the valve 46 opened so as to thereby allow the water from the tank 10 to by-pass the vessels 22 and 24 and flow directly into the filter 36.

The preliminary operations described may be speeded up by applying manual pressure to the handles 50 and 51 on the plungers, to help force the liquids through the filter.

After the filter membrane has been formed as above, the collection of potable water at the outlet 47 may begin, and air pressure is maintained in tank 10 until the full supply of water contained therein has been driven through the filter. The entire equipment can then be cleaned and refilled for another cycle.

Figure 2:
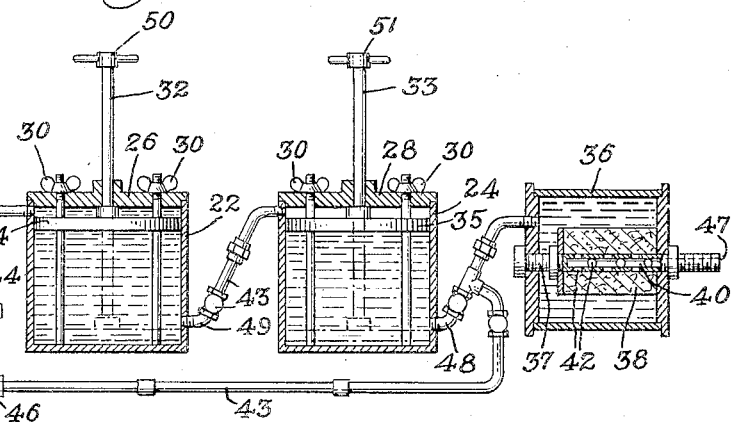
Figure 2 is a view showing my equipment disassembled and packed for shipment or storage, the outer container being shown in vertical section to disclose the arrangement of the other units inside.
Figure 2:
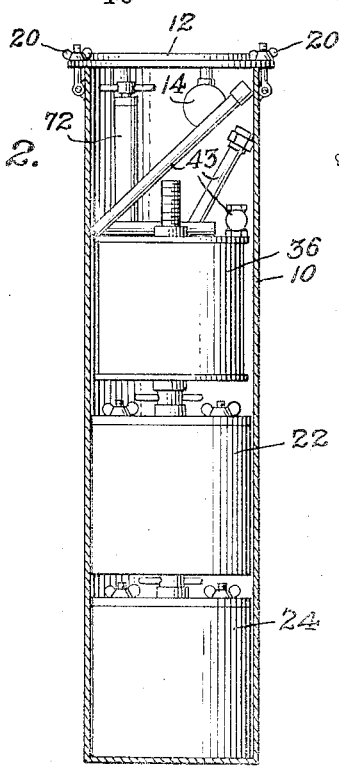
Figure 3:
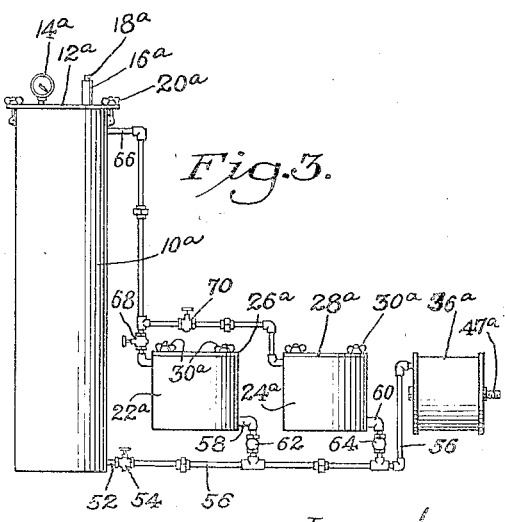
Figure 3 is an elevational view of a modified arrangement of my apparatus.

In Figure 3 is shown a modified arrangement of the apparatus which eliminates the plungers in the intermediate units. The parts in Figure 3 which are substantially the same as those previously described in Figures 1 and 2 are designated by like numerals, with the addition of the suffix *a*. The tank 10*a* has a bottom outlet 52 which leads through a valve 54 to a pipe line 56 extending to the inlet of the filter unit 36*a*. Vessels 22*a* and 24*a* have bottom outlets 58 and 60, leading through check valves 62 and 64 and into pipeline 56.

Tank 10*a* is provided with a second outlet, designated as 66. This outlet must be above the waterline at all times, so that it receives compressed air when the tank is put under pressure. Fittings are provided to run a line from outlet 66 to the top portions of vessels 22*a* and 24*a* through valves 68 and 70, respectively.

Vessels 10*a*, 22*a*, and 24*a* are filled with water and chemicals in the manner previously described. With valves 54 and 68 closed, a pressure of 10 pounds per square inch, for example, is pumped up in tank 10*a*. When valve 70 is open, the air pressure will be admitted to vessel 24*a*, causing the water therein, with the accompanying filter-aid, to be forced into the filter unit 36*a*.

When all the water in vessel 24*a* has been forced out, valve 70 is closed, valve 68 is opened, and the process is repeated with the water and chemicals contained in vessel 22*a*. After the filter-aid and activated carbon in vessel 22*a* have been deposited on the filter stone in filter unit 36*a*, the apparatus is ready for the actual water filtration process. Valve 68 is closed and valve 54 is opened, running water direct through the line 56 into the filter unit. The water flowing out of the filter at 47*a* may be caught in any suitable receptacle. As before, it will be found necessary to use the hand pump in order to keep up sufficient pressure in tank 10*a* to force the water steadily through the filter until tank 10*a* is empty.

One of the advantageous features of my apparatus is illustrated particularly in Figure 2. The intermediate units 22 and 24 and the filter unit 36 are made slightly smaller than the tank 10, so that they may be placed inside it, as shown in the figure. The tank is long enough so that the three units, together with all the necessary pipe fittings and valves 43, and a pump 72 may be placed inside. Even tools for assembly of the pipe fittings can be included, if desired. The necessary chemicals for a substantial period of operation can be carried in the removable-top vessels 22 and 24. In addition, the construction of the cover 12 is such that it can be mounted equally well in inverted position, as shown in Figure 2. When the cover is mounted in this way, the valve stem and pressure gauge are protected, and do not project out where they might be damaged, or might interfere with convenient storage or transport.

The resulting package is handy, strong, rugged, fire-proof and economical of space—all features of importance for military use or for shipment by air.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. A water treatment apparatus comprising, in combination, a tank containing water and adapted to receive and retain air under pressure, a filter unit having a porous filter stone therein, a plurality of air-tight vessels adapted to contain a fluid, a plunger in each vessel over the fluid therein, conduit means adapted to conduct water under pressure from said tank to the interior of the first of said vessels above the plunger so as to urge the plunger downwardly, conduit means adapted to conduct fluid from the first vessel upon downward movement of its plunger to the interior of the second vessel above its plunger so as to urge said plunger downwardly, conduit means adapted to conduct fluid under pressure from said last named vessel upon downward movement of its plunger to the filter unit, means in each vessel to render the conduits effective to conduct water from the tank through the vessels to the filter unit, a valve controlled by-pass conduit effective to conduct water directly from the tank to the filter unit, and manual means to actuate the plungers independent of the pressure within said tank.

2. A water treatment apparatus comprising, in combination, a tank containing water and adapted to receive and retain air under pressure, a filter unit having a porous filter stone therein, a plurality of air-tight vessels adapted to contain a fluid, a plunger in each vessel over the fluid therein, conduit means adapted to conduct water under pressure from said tank to the interior of the first of said vessels above the plunger so as to urge the plunger downwardly, conduit means adapted to conduct fluid from the first vessel upon downward movement of its plunger to the interior of the second vessel above its plunger so as to urge the second plunger downwardly, conduit means adapted to conduct fluid under pressure from said last named vessel upon downward movement of its plunger to the filter unit, means in each vessel to render the conduits effective to conduct water from the tank through the vessels to the filter unit, a by-pass conduit effective to conduct water directly from the tank to the filter unit, and valves in said conduit means and by-pass to control the flow therethrough.

3. A water treatment apparatus comprising, in combination, a tank containing water and adapted to receive and retain air under pressure, a filter unit having a porous filter stone therein, a plurality of air-tight vessels adapted to contain a fluid, a plunger in each vessel over the fluid therein, conduit means adapted to conduct water under pressure from said tank to the interior of the first of said vessels above the plunger so as to urge the plunger downwardly, conduit means adapted to conduct fluid from the first vessel upon downward movement of its plunger to the interior of the second vessel above its plunger so as to urge the second plunger downwardly, conduit means adapted to conduct fluid under pressure from said last named vessel upon downward movement of its plunger to the filter unit, means in each vessel to render the conduits effective to conduct water from the tank through the vessels to the filter unit, and a by-pass conduit effective to conduct water directly from the tank to the filter unit.

4. A water treatment apparatus comprising, in combination, a tank containing water and adapted to receive and retain air under pressure, a filter unit having a porous filter stone therein, a plurality of air-tight vessels adapted to contain a fluid, a plunger in each vessel over the fluid therein, conduit means adapted to conduct water under pressure from said tank to the interior of the first of said vessels above the plunger so as to urge the plunger downwardly, conduit means adapted to conduct fluid from the first vessel upon downward movement of its plunger to the interior of the second vessel above its plunger so as to urge the second plunger downwardly, conduit means adapted to conduct fluid under pressure from said last named vessel upon downward movement of its plunger to the filter unit, and means in each vessel to render the conduits effective to conduct water from the tank through the vessels to the filter unit.

5. A water treatment apparatus comprising, in combination, a tank containing water and adapted to receive and retain air under pressure, a filter unit having a porous filter stone therein, a plurality of air-tight vessels adapted to contain a fluid, conduit means adapted to conduct water under pressure from said tank to the upper end of the interior of the first of said vessels, conduit means adapted to conduct fluid from the lower end of the first vessel to the upper end of the interior of the second vessel, conduit means adapted to conduct water under pressure from the lower end of said last named vessel to the filter unit, means in each vessel to render the conduits effective to conduct water from the tank through the vessels to the filter unit after the fluid has been conducted therefrom, and a valve controlled by-pass conduit effective to conduct water directly from the tank to the filter unit.

6. A water treatment apparatus comprising, in combination, a tank containing water adapted to receive and retain air under pressure, a filter unit having a porous filter stone therein, a plurality of air-tight vessels adapted to contain a fluid, a plunger in each vessel, means to operate the plunger of each vessel to force the fluids through outlets in said vessels, conduit means adapted to conduct the fluid from said outlets to said filter unit, conduit means to conduct water under pressure from said tank through said vessels to the filter unit, and a by-pass effective to conduct water directly from the tank to the filter unit.

7. A water treating apparatus comprising, in combination, a filter, a tank containing water and adapted to receive and retain air under pressure for delivering water to said filter, two vessels containing fluid treating materials to be injected into water delivered to said filter, and means responsive to the air pressure in the tank to produce a flow of fluid treating materials from the vessels to the filter, the flow of fluid treating materials taking place selectively from one vessel to the filter and from the second vessel through the first vessel to said filter.

8. A water treating apparatus comprising, in combination, a filter, a tank containing water and adapted to receive and retain air under pressure for delivering water to said filter, a pair of vessels containing fluid treating materials to be injected into water delivered from said tank to said filter, means responsive to the air pressure in the tank to produce a flow of fluid treating materials of one vessel to a second vessel and to discharge the material from the second vessel into the water entering the filter.

JEROME B. LEVY.